United States Patent [19]

Kotzur

[11] Patent Number: 5,495,569
[45] Date of Patent: Feb. 27, 1996

[54] CIRCUIT FOR ENSURING THAT A LOCAL INTERRUPT CONTROLLER IN A MICROPROCESSOR IS POWERED UP ACTIVE

[75] Inventor: Gary B. Kotzur, Spring, Tex.

[73] Assignee: Compaq Computer Corp., Houston, Tex.

[21] Appl. No.: 366,778

[22] Filed: Dec. 30, 1994

[51] Int. Cl.⁶ ............................................ G06F 11/00
[52] U.S. Cl. ................ 395/181; 395/183.12; 395/182.08
[58] Field of Search ..................... 395/183.12, 182.08, 395/183.08, 181, 180

[56] References Cited

U.S. PATENT DOCUMENTS

| | | | |
|---|---|---|---|
| 4,646,298 | 2/1987 | Laws et al. | 395/575 |
| 4,775,976 | 10/1988 | Yokoyama | 395/575 |
| 4,823,256 | 4/1989 | Bishop et al. | 395/575 |
| 4,839,895 | 6/1989 | Kakita | 395/575 |
| 5,283,792 | 2/1994 | Davies, Jr. et al. | 395/575 |
| 5,283,904 | 2/1994 | Carson et al. | 395/725 |
| 5,408,647 | 4/1995 | Landry | 395/575 |
| 5,434,998 | 7/1995 | Akai et al. | 395/575 |

*Primary Examiner*—Robert W. Beausoliel, Jr.
*Assistant Examiner*—Ly V. Hua
*Attorney, Agent, or Firm*—Pravel, Hewitt, Kimball & Krieger

[57] ABSTRACT

A hot spare boot circuit that automatically switches from a non-operational CPU to an operational CPU for powering up the computer system. In the multiprocessor computer system, a first CPU is designated to perform power on operations. If the first CPU fails, which is determined when a dead man counter in the hot spare boot circuit times out, the hot spare circuit ensures that the first CPU is in a disabled state. Next, the hot spare boot circuit identifies an operational second CPU, reinitializing certain ID information as necessary such that the second CPU can properly perform power on operations. The hot spare boot then awakens the second CPU, using a startup interprocessor interrupt in one embodiment, or simply negating the hard reset of the second CPU in a second embodiment. The second CPU then proceeds to perform the power on functions.

19 Claims, 6 Drawing Sheets

CIRCUIT FOR ENSURING THAT A LOCAL INTERRUPT CONTROLLER IN A MICROPROCESSOR IS POWERED UP ACTIVE

BACKGROUND OF THE INVENTION

1. Field of the Invention

The invention relates to powering up a microprocessor in a computer system, and more particularly, to a circuit that ensures that a local interrupt controller in the microprocessor powers up in the active state.

2. Description of the Related Art

Microprocessors have seen rapid improvements in speed and performance. For example, the latest generation of microprocessors from Intel Corporation include the Pentium processors, which contain significant enhancements over the prior generation 486 processors. Even with the rapid improvements in microprocessor performance, however, resource requirements of software applications are always increasing, which in turn drives the need for the design and development of ever more powerful and efficient computer systems.

One well known method of improving computer performance is to provide multiple processors in a single system. Both asymmetrical and symmetrical multiprocessor systems have been developed. In asymmetrical multiprocessor systems, one microprocessor is the master and another microprocessor performs specific functions as a slave of the master microprocessor. In this configuration, the slave processor performs only operations designated by the master processor.

The symmetrical multiprocessor system is more efficient than the asymmetrical system, as tasks are more evenly divided between the processors. Thus, in a symmetrical system, any processor can perform any required function. Thus, all microprocessors operate simultaneously, spending little or no idle time, and the computer system operates near its maximum efficiency. However, although symmetrical multiprocessor systems are efficient, they are also very difficult to design, thereby adding to their cost and complexity. As a result, only very high end users can afford symmetrical multiprocessing systems.

To alleviate design complexities of multiprocessor systems, Intel has developed the Pentium P54C and P54CM processors. The P54C and P54CM processors integrate logic necessary for a dual processor system, each including an on-chip advanced programmable interrupt controller (APIC). The local APICs support multiprocessor interrupt management, multiple I/O subsystem support, compatibility with the EISA 8259 interrupt controllers, and interprocessor interrupts between the two processors.

The APIC is a standardized approach developed by Intel for symmetric multiprocessing. It allows any interrupt to be serviced by any CPU. The APIC architecture is implemented in two pieces: an "I/O APIC" resides close to the I/O subsystem and a "local APIC" is implemented inside the P54C or P54CM processors. The I/O APIC contains edge/ level and input polarity logic, and tables to allow individual interrupts to be addressed to one or more CPUs at various interrupt priorities. The local APIC is implemented inside each of the P54C or P54CM processors and receives interrupt messages from the I/O APIC and keeps track of which interrupts are in service by each CPU. The local APICs are also responsible for sending special interprocessor interrupt (IPI) messages over an APIC bus to the other CPU to accomplish special functions. Thus, on a dual processor board utilizing a P54C processor and a P54CM processor, the two processors can be directly connected to the processor bus without the need for additional logic. This highly integrated solution greatly simplifies the design of dual processor systems.

In a multiprocessor system, a problem that sometimes occurs is that one of the multiple processors may fail. Thus, it is desirable that some sort of fault-tolerant scheme be developed, particularly during power up, to ensure that the computer system continues to function even though a non-operational processor is encountered. One method of booting up a multiprocessor system is to assign a primary processor responsible for powering up the computer system. Once the computer system has been successfully started up, the primary processor then turns on and tests the remaining processors and various other components in the computer system. If the primary microprocessor does not function properly, however, it would be unable to turn on the remaining processors, leaving the entire computer system incapacitated. Consequently, the computer owner or operator has a computer system with one or more operational CPUs, but the system is useless until the repairman arrives.

One approach to resolve this problem is utilized in the Compaq Systempro XL and Proliant 2000 and 4000 computer systems and is described fully in application Ser. No. 07/956,649, entitled "Automatic Logical CPU Assignment of Physical CPUs" filed Oct. 2, 1992 and hereby incorporated by reference. The technique utilizes a deadman timer associated with each processor and specialized hardware to determine the first logical processor. On reset, the physical processor numbers are set as the logical processor values. Only logical processor zero is allowed to boot the computer system and initiates the remaining processors, which have been in a sleep condition. If the logical processor zero does not access a given address location within a given timer period, the associated deadman timer expires and sends a signal to the specialized hardware to cause all logical processor values to be decremented. The current logical processor zero becomes failed and the new logical processor zero commences the boot sequence. This process continues until a successful boot operation occurs.

This technique was further improved in versions of the Compaq Proliant 2000 and 4000 computer systems using procedures described in application Ser. No. 08/119,424, entitled "Automatic Reassignment of Booting CPU Based on Prior Errors" filed Sep. 10, 1993 and hereby incorporated by reference. In this improvement, when logical processor zero starts the booting process, it first checks an error log to see if certain critical errors have previously occurred on that processor. If so, the booting sequence stops and the deadman timer causes CPU rotation. The logical processor zero also checks for critical errors prior to actually loading the operating system and if any have occurred, changes the next logical processor to processor zero, passes the booting control and shuts itself down.

However, these techniques could not be directly applied to a dual processor P54C and P54CM system because the specialized hardware was not available and different techniques were used to start the P54CM second processor. Therefore, the non-operational processor problem reappears in the P54C and P54CM systems, with the problem exacerbated by the knowledge that solutions exist in other configurations.

SUMMARY OF THE PRESENT INVENTION

It is therefore an object of the present invention to identify an operational microprocessor in a multiprocessor system so that the system can be properly powered up when the primary microprocessor is nonoperational. A hot spare boot circuit according to the present invention automatically reassigns the power up responsibilities to an operational second processor should the primary processor fail. The hot spare boot circuit first determines if the primary processor responsible for powering up the computer system is operational when the computer system is initially started. In the preferred embodiment, a counter that times out after a predetermined period is used to determine if the primary processor is non-operational. If the counter times out, the hot spare boot circuit resets each of the plurality of processors in the multiprocessor system. In a first embodiment of the present invention, one reset signal is used to reset the processors. Thus, deasserting the reset signal will allow both processors to come out of reset. After the reset signal has been deasserted, the hot spare boot circuit places the non-operational processor in the tristate test mode and reinitializes an identifier in the operational processor such that it acts as the primary processor. Then, the hot spare boot circuit sends a startup interprocessor interrupt message to the operational processor to awaken it. In response, the operational processor performs the necessary power on functions.

In a variation to the first embodiment of the present invention, rather than having to send the startup interprocessor interrupt, the operational processor is reconfigured such that it becomes the primary processor. Each processor includes a CPUTYPE pin for identifying whether the processor is a primary or dual processor. If the CPUTYPE pin is pulled low, then the processor is a primary processor; if pulled high, the processor is a dual processor. Thus, when the primary processor is detected as being non-operational, the state of the CPUTYPE pin on the other, operational processor is switched so that the operational processor becomes the primary processor. As a result, the need for an interprocessor interrupt message is avoided, as the operational processor behaves as a primary processor in powering up the computer system.

In an alternative embodiment of the present invention, each of the processors in the computer system is connected to a separate processor bus, with each processor configured as a primary processor. To prevent the processors from all powering up at the same time, sleep signals are asserted to all but one of the processors to prevent those processors from becoming active. In normal operation, once the power up processor has completed performing its power on functions, it causes the sleep signals to the other processors to be deasserted. However, if the power up processor is non-operational, the sleep signal to an operational processor is automatically deasserted, allowing it to be awakened. In this embodiment, separate reset signals are used to reset the processors. Consequently, the hot spare circuit can maintain the reset signal to the non-operational processor asserted, while deasserting the reset signal provided to another processor reassigned to perform the power on functions. As each of the processors is connected to a separate processor bus, the non-operational processor need not be tristated as there would be no potential contention for the processor bus signals.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
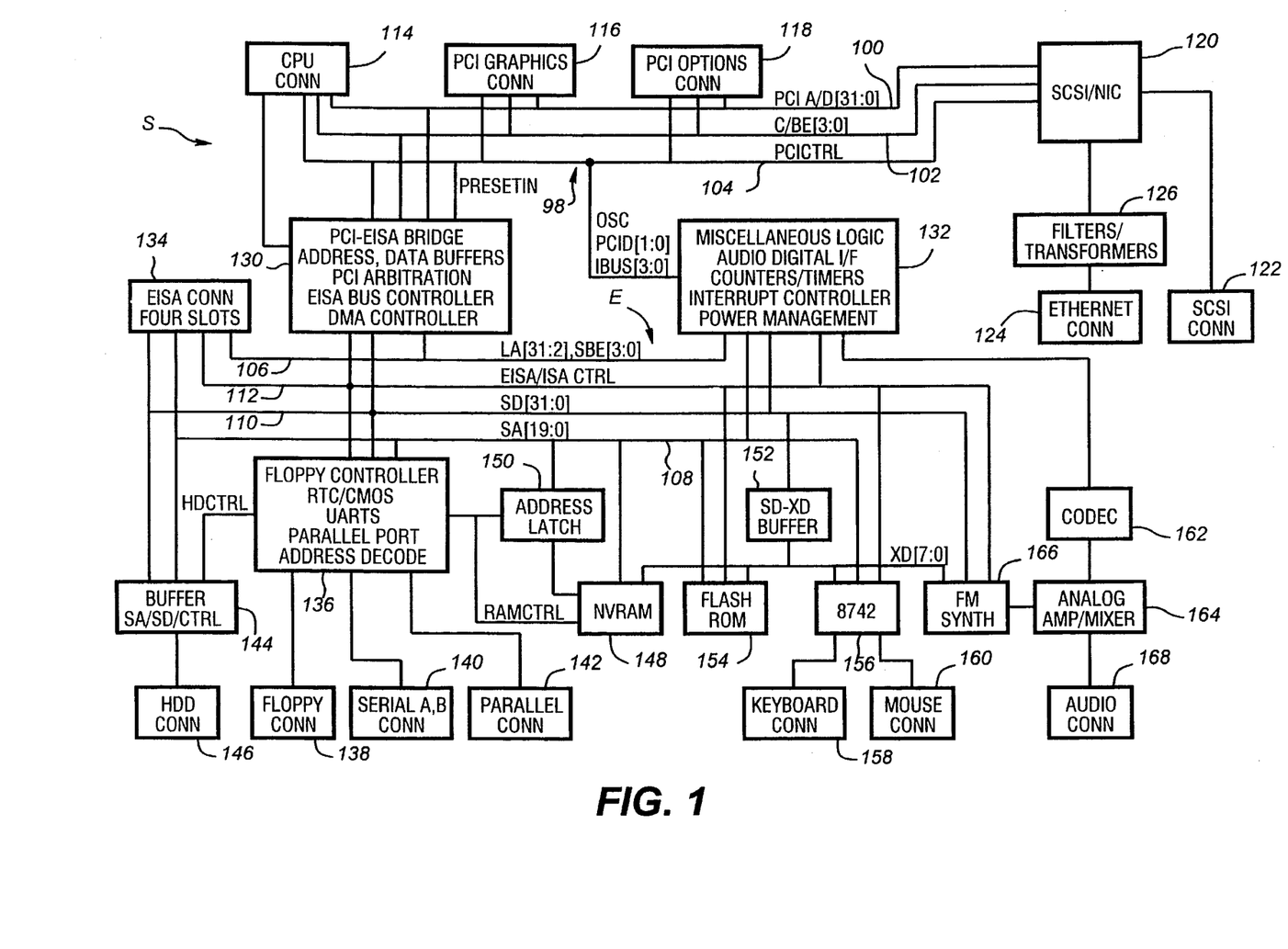
FIG. 1 is a block diagram of a system board for use with the preferred embodiment of the present invention.
Figure 2:
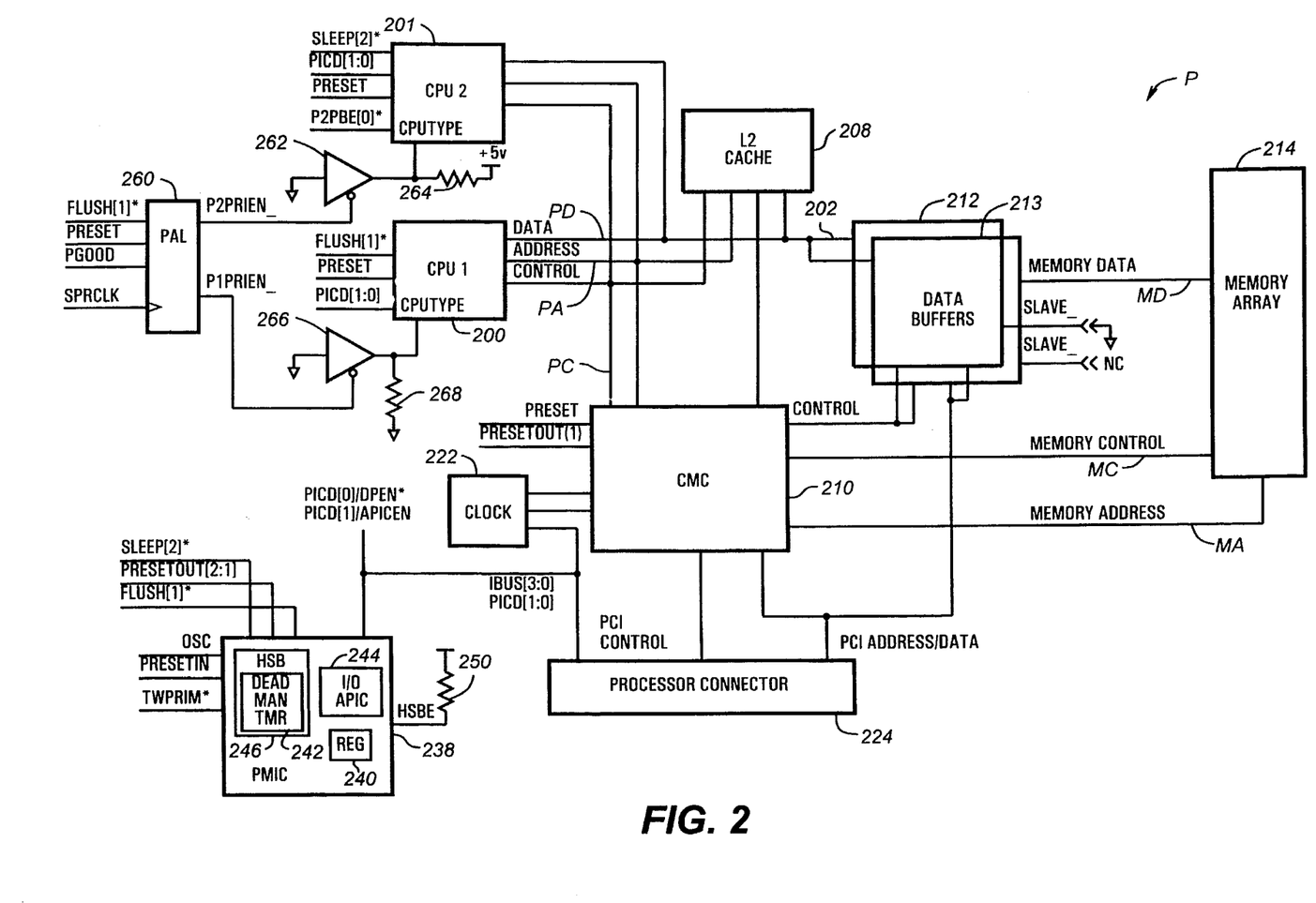
FIG. 2 is a block diagram of a processor board including multiple processors and a hot spare boot circuit according to the present invention.

Referring now to FIG. 1, the system board S of an exemplary multiprocessor computer system incorporating the preferred embodiment of the present invention is shown. In the preferred embodiment, the system board S contains circuitry and slots for receiving interchangeable circuit boards, including a processor board P as shown in FIG. 2. The system board S also includes two primary buses. The first bus is the PCI or Peripheral Component Interconnect bus 98 which includes address/data portion 100, also referred to as PCIAD, control and byte enable portion 102 and control signal portion 104. The control signal portion 104 includes a clock PCICLK preferably running at 33 MHz. The PCICLK clock is provided by the processor board P and is the main PCI bus clock. The address/data bus PCIAD is preferably 32 bits wide, although it can be upgraded to 64 bits if desired. The second primary bus on the system board S is the EISA bus 99. The EISA bus 99 includes LA address portion 106, SA address portion 108, SD data portion 110 and EISA/ISA control signal portion 112. The PCI and EISA buses 98 and 99 form the backbones of the system board S.

A CPU connector 114 is connected to the PCI bus 98 to receive the processor board P having two microprocessors. A PCI graphics connector 116 is connected to the PCI bus 98 to receive a video graphics card (not shown). The graphics card provides video signals to an external monitor (not shown). A PCI option connector 118 is also connected to the PCI bus 98 to receive any additional cards designed according to the PCI standard. In addition, a SCSI and network interface (NIC) controller 120 is connected to the PCI bus 98. Preferably, the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system board S and computer to a local area network (LAN).

A PCI-EISA bridge 130 is provided to convert signals between the PCI bus 98 and the EISA bus 99. The PCI-EISA bridge 130 includes the necessary address and data buffers and latches, arbitration and bus master control logic for the PCI bus, EISA arbitration circuitry, an EISA bus controller as conventionally used in EISA systems, and a DMA controller. Preferably the PCI-EISA bridge 130 is a single integrated circuit, but other combinations are possible. During power up, the PCI-EISA bridge 130 asserts the signal PRESETIN for approximately 200 milliseconds to reset the processor board P.

A miscellaneous system logic chip 132 is connected to the EISA bus 99. In the preferred embodiment, the miscellaneous system logic chip 132 is implemented as an ASIC. The miscellaneous system logic chip 132 contains a digital audio interface, counters and timers as conventionally present in personal computer systems, an interrupt controller for both the PCI and EISA buses 98 and 99 and power management logic, as well as other miscellaneous circuitry. The interrupt controller portion of the miscellaneous system logic chip 132 transmits interrupt signals to the microprocessor on the processor board P via signals IBUS[3:0]. As there are 24 interrupts in the PCI/EISA system, the interrupts are transmitted 4 at a time across IBUS[3:0] in 6 OSC clocks. The OSC clock is provided by logic on the processor board P, and preferably has a frequency of approximately 14.3 MHz.

In an alternative embodiment, the miscellaneous logic chip 132 is implemented with the 82374EB EISA System Component (ESC) chip from Intel, while the PCI-EISA bridge 130 is the 82375EB PCI-EISA Bridge (PCEB) chip from Intel. The ESC includes an I/O advanced programmable interrupt controller (APIC) so that it can communicate interrupts directly to the processors located on the processor board P over APIC data bits PICD[1:0]. In this alternative embodiment, the signal PRESETIN is asserted not by the PCEB chip but by a separate integrated chip.

A series of four EISA slots 134 are connected to the EISA bus 99 to receive ISA and EISA adapter cards. A combination I/O chip 136 is connected to the EISA bus 99. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus 99 and the combination I/O chip 136 to act as a buffer between the EISA bus 99 and a hard disk drive connector 146 to allow connection of an IDE-type hard disk drive (not shown). A non-volatile random access memory (NVRAM) 148 is connected to the EISA bus 99 and receives its control signals from the combination I/O chip 136. An address latch 150 is connected to the EISA bus 99 and controlled by the combination I/O chip 136 to provide additional addressing capability for the NVRAM 148. Preferably the NVRAM 148 is used to contain certain system information.

A data buffer 152 is connected to the SD portion of the EISA bus 99 to provide an additional data bus XD for various additional components of the computer system. The NVRAM 148 is connected to the XD data bus to receive its data bits. A flash ROM 154 receives its control and address signals from the EISA bus 99 and is connected to the XD bus for data transfer. Preferably, the flash ROM 154 contains the BIOS information for the computer system and can be reprogrammed to allow for revisions of the BIOS. The BIOS contains the instructions for performing power on functions. One of the microprocessors on the processor board is designated as the primary processor for running the BIOS code. An 8742 or keyboard controller 156 is connected to the XD bus and EISA address and control portions 108 and 112.

The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus 99 and is controlled by the miscellaneous system logic chip 132. An audio connector 168 is provided to allow external audio connections to the computer and is connected to the outputs and inputs of the analog amplifier and mixer 164.

It is understood that this is an exemplary embodiment of a computer system. Many alternative embodiments could exist. For example, there would be additional PCI and EISA slots if the computer system was intended for file server use, with the video system then preferably connected off of the EISA bus 99 and the audio system components removed. Other variations will be apparent to one skilled in the art.

Referring now to FIG. 2, the processor board P for use with the system board S is shown. In the processor board P, the primary CPU or microprocessor 200 is preferably the 64-bit Pentium P54C processor from Intel, which operates at 50 or 60 MHz externally and 75 or 90 MHz internally. The microprocessor 200 is connected to a processor bus 202 having data, address and control portions PD, PA and PC. A second microprocessor 201, preferably the Pentium P54CM from Intel, is also connected to the processor bus 202. Each of the Pentium P54C and P54CM processors includes an on-chip advanced programmable interrupt controller (APIC). The local APICs support multiprocessor interrupt management as well as perform interprocessor interrupts (IPIs) for communication with each other. The local APICs work in conjunction with an I/O APIC 244 located externally on a PCI multiprocessor interface chip (PMIC) 238. If the miscellaneous logic chip 132 is implemented with the ESC, then a portion of the I/O APIC is located on the ESC. In addition to the I/O APIC 244, the PMIC 238 also includes a hot spare boot circuit 246 and a CPU case register 240, which will be described below.

The CPU 200 (or logical CPU1) is preferably configured as the primary processor responsible for booting up the system. In normal operation, after the PCI-EISA bridge 130 has negated PRESETIN low, CPU1 vectors to an entry point in the flash ROM 154 to execute the BIOS code. In addition to properly initializing various system components, CPU1 also awakens the second processor 201 (logical CPU2) to place it in operation. To start the P54CM processor, CPU1 transmits a startup IPI message to CPU2.

The I/O APIC 244 in the PMIC 238 receives PCI and EISA interrupts through signals IBUS[3:0]. In response, the I/O APIC forwards the interrupts to the local APICs in the microprocessors 200 and 201 over the APIC bus PICD[1:0] as appropriate. The PMIC 238 also provides reset signals PRESETOUT[2:1]. In the P54C/CM dual processor configuration, the signal PRESETOUT[1] is provided to a processor cache and memory controller (CMC) and PCI bridge 210. The CMC 210 has a clock input connected to the processor clock, which runs at either 50 or 60 Mhz. In response to the signal PRESETOUT[1], the CMC 210 asserts a hard reset signal PRESET to both CPU1 and CPU2. The signal PRESETOUT[2] is unused in this configuration.

Ordinarily, both signals PRESETOUT[2:1] follow the state of the system reset signal PRESETIN delayed by one PCICLK clock. However, as will be explained below, the signals PRESETOUT[2:1] behave differently if the primary CPU1 fails.

Each of the microprocessors 200 and 201 include an internal or L1 cache memory. A level 2 (L2) or external cache memory system 208 is connected to the processor bus 202 to provide additional caching capabilities to improve performance of the computer system. The CMC 210 is connected to the control portion PC and to the address portion PA. For the P54C/CM configuration, a single L2 cache is used for both microprocessors 200 and 201. In the two primary processor configuration, each processor is coupled to a separate L2 cache through the separate processor buses.

A set of two data buffers 212 and 213, which are preferably implemented with ASICs, are connected between the processor data bus PD and the 64-bit memory data bus MD provided by a memory array 214. Control signals to the data buffers 212 and 213 are provided by the CMC 210. The data buffers 212 and 213 are also connected to the PCI address and data bus PCIAD through a connector 224, which is provided to be mateably received by the processor connector 114.

The data buffers 212 and 213 each include a SLAVE_ input. As shown, the SLAVE_ input to the data buffer 212 is tied to ground and the SLAVE_ input of the data buffer 213 is not connected, the input being pulled high by an internal pull-up resistor. The data buffer 212 is referred to as the slave data buffer, and the data buffer 213 is referred to as the master data buffer. Each data buffer receives half the data bits from the processor, memory and PCI data buses PD, MD, and PCIAD, respectively.

Clock distribution and generation circuitry 222 is associated with the processor card P and is connected to the CMC 210. The clock distribution circuitry 222 provides a clock PCLK to the processor bus 202, as well as the clock OSC for running a dead man counter 242 in the hot spare boot circuit 246 and for clocking transfers over the bus IBUS[3:0]. The processor connector 224 is connected to the CMC 210 and the clock distribution circuitry 222 to provide clocks (including PCICLK) to the computer system and to provide a PCI interface to allow the microprocessors 200 and 201 to access the PCI and EISA buses 98 and 99 and to allow PCI and EISA bus masters to access the main memory array 214. The PCI address and data are multiplexed on the bus PCIAD, with the address provided during the address phase and data provided during the data phase.

Figure 2A:
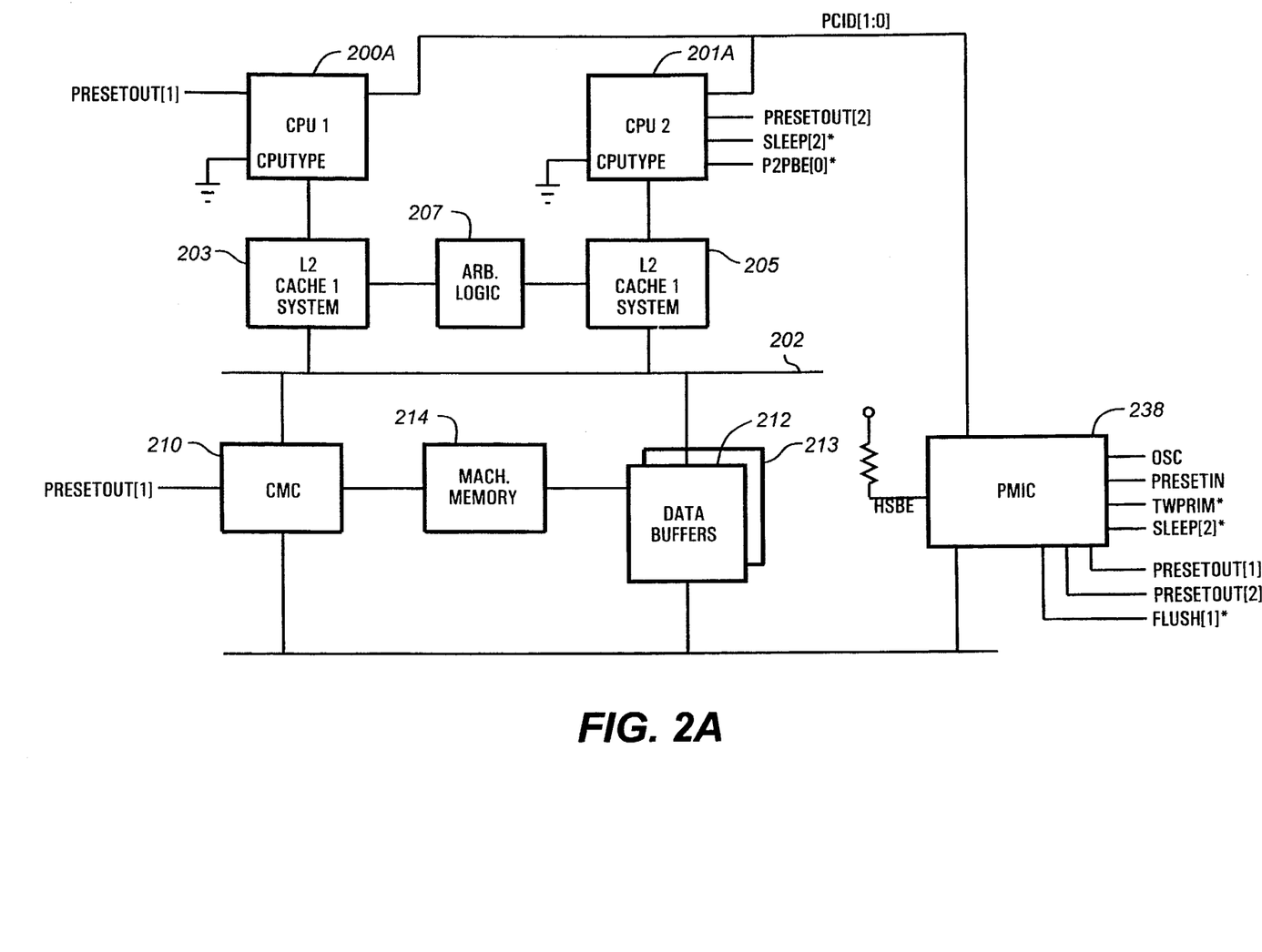
FIG. 2A is a block diagram of an alternative processor board including multiple processors and a hot spare boot circuit according to the present invention.

In an alternative multiprocessor configuration, two Pentium P54C processors (each including a local APIC) are used instead of the P54C/CM configuration. This configuration will be referred to as the two primary processor configuration and is shown in FIG. 2A. Unlike the P54C/CM configuration, where both processors share all the processor signals, each of the processors in the two primary processor configuration is connected to a separate processor bus. With the processors thus separated, there is no contention for a single processor bus, as does exist in the P54C/CM configuration.

Referring now to FIG. 2A, the CPU1 200A and CPU2 201A are each connected to respective L2 cache systems 203 and 205, with arbitration logic 207 connected to each cache system 203, 205. The cache systems 203, 205 are connected to the processor bus 202, with a CMC 210, data buffers 212 and 213 and memory 214 configured as in the processor board of FIG. 2. It is noted that the CPUTYPE pins of CPU1 200A and CPU2 201A are grounded so that both appear as primary or P54C-type processors.

A PMIC 238 is also located on the processor board of FIG. 2A. The signals PICD[1:0] are connected to CPU1 200A, CPU2 201A and the PMIC 238. The signal PRESETOUT[1] is connected to CPU1 200A, while the signal PRESETOUT [2] is connected to CPU2 201A. The PMIC 238 also is connected to a signal P2PBE[0]* used to switch the local APIC ID in CPU2 201A when the primary CPU1 200A fails. In the preferred embodiment, the local APIC ID of CPU1 200A is assigned the value 0b0000 and the local APIC ID of CPU2 201A is assigned the value 0b0001.

A variation of the two primary processor configuration involves use of processors without local APICs. In this alternative configuration, additional external logic on the processor board P must be implemented to allow CPU1 and CPU2 to communicate with each other and to handle interrupts. In both the two primary processor configurations, the PMIC 238 provides PRESETOUT[1] to CPU1 200A and PRESETOUT[2] to CPU2 201A as hard resets. After the PCI-EISA bridge 130 negates the system reset signal PRESETIN, CPU1 200A acts as the power on processor while CPU2 201A is maintained disabled through the use of a signal SLEEP[2]*. The signal SLEEP[2]* is controlled by a sleep bit in a CPU2 control register located in the PMIC 238. If the sleep bit is set high, then the signal SLEEP[2]* is asserted low. However, if the sleep bit is set low, then the signal SLEEP[2]* is deasserted high.

For the two primary processor with APIC configuration, CPU1 200A awakens CPU2 201A by first clearing the sleep bit in the CPU2 control register and then transmitting a startup IPI message. For the two primary processor without APIC configuration, a reset bit in the CPU2 control register is first set high before the sleep bit is cleared by CPU1. Writing a "1" to the reset bit causes the reset signal PRESETOUT[2] to be pulsed high for 15 PCICLK clocks. When both the signals SLEEP[2]* and PRESETOUT[2] are deasserted, CPU2 201A is awakened.

Bits 4, 5 and 6 of the CPU case register 240 (referred to as CPU_CASE[6:4]) in the PMIC 238 indicate the type of CPU configuration. If bits CPU_CASE[6:4] contain a value 0b000, then that indicates there is only one CPU in the system. If bits CPU_CASE[6:4] contain the value 0b100, then that indicates a multiprocessor system configured with a P54C processor and a P54CM processor. If bits CPU_CASE[6:4] contain the value 0b001, then that indicates a multiprocessor system configured with two primary processors which do not include local APICs. Finally, if bits CPU_CASE[6:4] contain the value 0b011, then that indicates a multiprocessor system with two primary processors having local APICs, such as two P54C processors. The bit CPU_CASE[7] if set high indicates that the primary boot processor CPU1 is dead and that the computer system has been booted on the secondary CPU2.

As noted above, CPU1 is preferably designated as the processor that performs the power on functions. However, if CPU1 fails, the hot spare boot circuit 246 according to the present invention automatically switches to CPU2 to perform the power on functions. As also noted, on system power on reset, the signal PRESETIN is asserted by the PCI-EISA bridge 130. The signal PRESETIN initializes all PMIC registers, internal state machines, and the dead man counter 242 located in the hot spare boot circuit 246. On the next rising edge of the clock PCICLK, the PMIC 238 asserts the signals PRESETOUT[2:1] high. In the two primary processor configuration, the signal PRESETOUT[1] is provided as a hard reset to CPU1 and the signal PRESETOUT [2] is provided as a hard reset to CPU2. In the P54C/CM configuration, the signal PRESETOUT[1] is provided to the CMC 210, which in response asserts the signal PRESET to both CPU1 and CPU2.

While the reset signals PRESETOUT[2:1] are asserted high, the microprocessor 201 responds by driving certain of its output pins to predetermined states. If the microprocessor 201 is a P54CM processor, it drives its DPEN* pin low. The DPEN, pin is shared with the APIC data pin PICD[0]. In addition, in the two primary processor configuration, if the microprocessor 201A is the P54C processor with a local APIC, the pin APICEN is driven low by the CPU2 201A. The signal APICEN is shared with the APIC data pin PICD[1].

After the PCI-EISA bridge 130 negates the reset signal PRESETIN, the signals PRESETOUT[2:1] are negated on the next rising edge of PCICLK. Additionally, on the falling edge of the signal PRESETIN, the following signals are sampled by the PMIC 238: the signal *DPEN, which when asserted low indicates that a P54CM is installed; a signal HSBE which when asserted high indicates that the hot spare boot capability of the PMIC 238 is enabled; the signal TWPRIM* which when asserted low indicates a multiprocessor system configured with two primary processors, with or without APICs; and the signal APICEN which when asserted high indicates that the APIC on CPU2 in the two primary processor configuration is enabled. The signal HSBE is pulled high by a pullup resistor 250, thereby indicating in the first embodiment that hot spare boot is always enabled. If all the above signals are sampled in their deasserted states (except for HSBE), then that indicates only one CPU is in the system and the hot spare boot capability is by default non-functional.

When the PMIC 238 detects a dual processor-system and the hot spare boot capability is enabled, the dead man counter 242 is started two OSC clocks after the system reset signal PRESETIN is negated. If CPU1 boots properly, the dead man counter 242 is reset when the CPU1 writes the processor case values into the register 240, which occurs relatively early in the power on self test or POST procedure. However, if the dead man counter 242 times out, then that indicates that CPU1 is non-functional. As a result, in accordance with the present invention, CPU1 is set or maintained in a disabled state, and the computer system is initialized by CPU2.

In a first embodiment of the P54C/CM dual processor configuration, the PMIC 238 awakens CPU2 by sending a startup IPI message to CPU2. The startup IPI message includes an interrupt vector pointing to a fixed entry point of the BIOS ROM 154, to which CPU2 will vector for beginning startup operations. The startup IPI is located at a predefined location in a redirection table located in the I/O APIC 244. The hot spare boot circuit 246 triggers access to the predefined location in the redirection table by asserting a signal STARTUP_ IPI. The IPI message is serially transferred from the PMIC 238 to CPU2 over the APIC data bits PICD[1:0].

In a second embodiment of the P54C/CM configuration, a startup IPI is not needed for awakening CPU2 in the P54C/CM configuration. Both the Pentium P54C and P54CM processors include a CPUTYPE pin. If the CPUTYPE pin is pulled low, the processor behaves as a P54C primary processor. If the CPUTYPE pin is pulled high, the processor behaves as a P54CM dual processor. In the first embodiment, the CPUTYPE pin of CPU1 is always pulled low and the CPUTYPE pin of CPU2 is always pulled high. In the second embodiment, the CPUTYPE pin of CPU2 is connected to the output of a tristate buffer 262 and the CPUTYPE pin of CPU1 is connected to the output of a tristate buffer 266. If the tristate buffer 262 is disabled, the CPUTYPE pin of CPU2 is pulled high by a resistor 264. If the tristate buffer 266 is disabled, the CPUTYPE pin of CPU1 is pulled low by a resistor 268.

The inputs of both tristate buffers 262 and 266 are connected to ground, and their enable inputs are connected to signals P2PRIEN_ and P1PRIEN_, respectively. The signals P2PRIEN_ and P1PRIEN_ are provided by a PAL 260, whose inputs receive signals FLUSH[1]*, PRESET, and PGOOD. The PAL 260 is clocked by a signal SPRCLK, which preferably has a frequency of the CPU clock. If CPU1 is detected to have failed, the PMIC 238 asserts the signal FLUSH[1]* while the signal PRESET is asserted to place CPU1 in tristate test mode. The PAL 260 senses the signal FLUSH[1]* asserted along with the signal PRESET to switch the states of signals P1PRIEN_ and P2PRIEN_ such that the tristate buffer 262 is enabled to drive the CPUTYPE pin of CPU2 low. Thus, as CPU2 has now been switched from a P54CM to a P54C processor, it will perform the power on functions once the signal PRESET is negated low by the CMC 210.

In the two primary processor configuration, if the dead man counter 242 times out, CPU1 200A is placed back in the reset state by asserting the signal PRESETOUT[1], while the signal PRESETOUT[2] is negated low a little more than one milliseconds after the dead man counter 242 times out to enable CPU2 201A. On the deassertion of the signal PRESETOUT[2], CPU2 201A performs the necessary power up functions, without the need for a startup IPI message.

Figure 3:
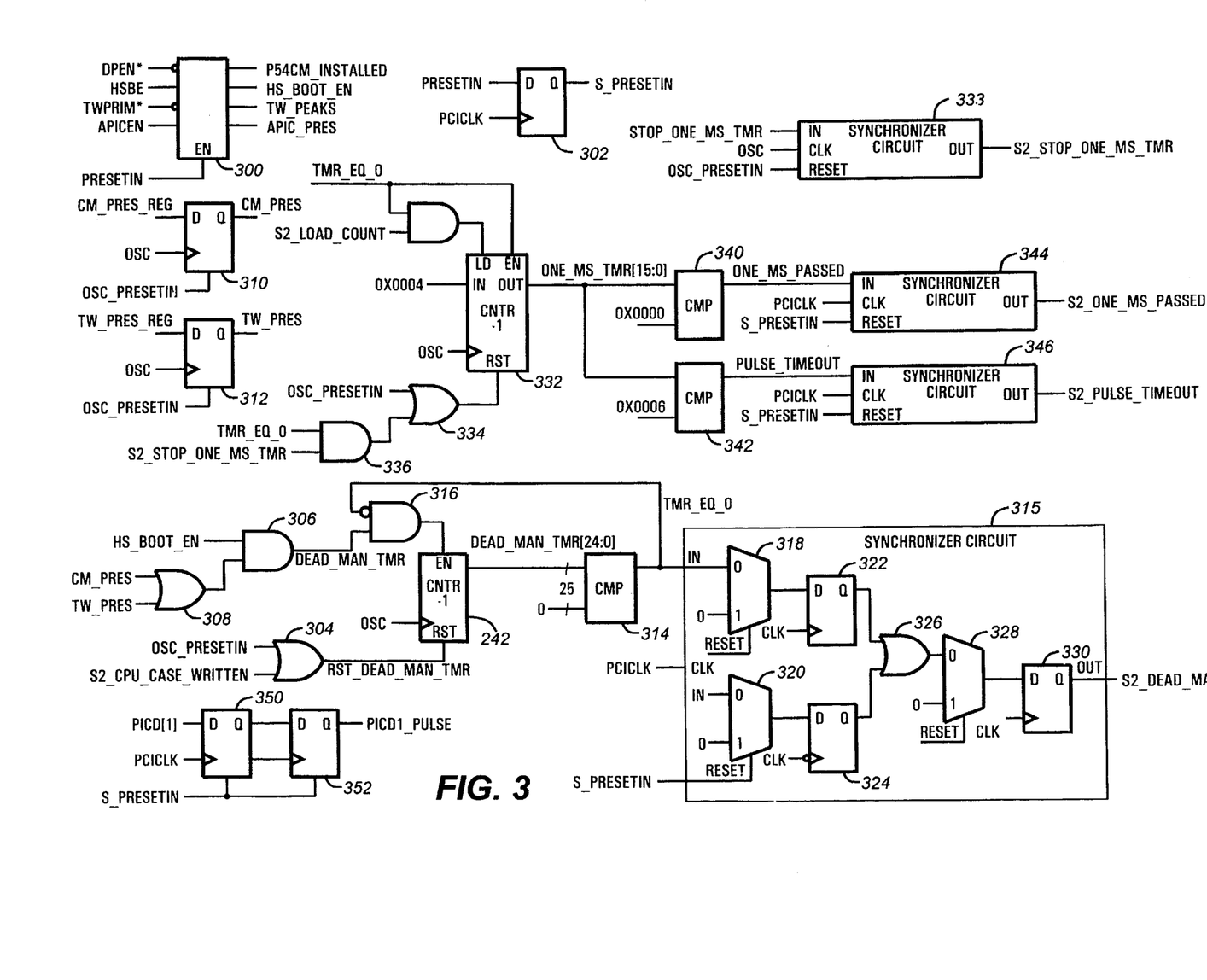
FIG. 3 is a logic diagram of portions of the hot spare boot circuit for determining the configuration of the multiprocessor system and for determining if a primary processor is non-operational.

Referring now to FIG. 3, a schematic diagram of the hot spare boot circuit 246 in the PMIC 238 is shown. A latch 300 receives the inverted state of the signal DPEN*, the signal HSBE, the inverted state of the signal TWPRIM* and the signal APICEN. The enable input of the latch 300 is connected to the signal PRESETIN. If the signal PRESETIN is asserted high, the latch 300 is transparent. On the following edge of the signal PRESETIN, the inverted state of the signal DPEN*, the state of the signal HSBE, the inverted state of the signal TWPRIM*, and the state of the signal APICEN are latched. The latch 300 provides output signals P54CM_INSTALLED for indicating if a P54CM processor is installed in the system, a signal HS_BOOT_EN to indicate whether the hot spare boot capability is enabled, a signal TW_PEAKS to indicate if the multiprocessor system is configured with two primary processors, and a signal APIC_PRES to indicate whether the two primary processors include local APICs.

The reset signal PRESETIN is also provided to the D input of a D flip-flop 302, which is clocked by the signal PCICLK. The output of the D flip-flop 302 provides the signal S_PRESETIN, which represents the signal PRESETIN synchronized to the clock PCICLK. In addition, another signal OSC_PRESETIN is developed in the hot spare boot circuit 246, which is synchronized to the clock OSC used by the dead man counter 242. If the signal PRESETIN is asserted high, the signal OSC_PRESETIN is asserted high on the next rising edge of the clock OSC. The signal OSC_PRESETIN falls two OSC clocks after the falling edge of the signal PRESETIN.

The signal OSC_PRESETIN is provided to one input of an OR gate 304, whose other input is connected to a signal S2_CPU_CASE_WRITTEN for indicating when the CPU case register 240 has been written once. If CPU1 powers up properly, CPU1 writes to the CPU case register 240 with appropriate values (as explained above) to indicate the type of CPU configuration, which values it will have read from the CPU case register 240. The output of the OR gate 304 drives a signal RST_DEAD_MAN_TMR for resetting the dead man counter 242. Thus, proper power up by CPU1 will cause the CPU case register 240 to be written, which in turn causes the dead man counter 242 to be reset. The dead man counter 242 preferably is reset to the initial value of 0x1B4F4C8. The enable input of the dead man counter 242 is connected to the output of an AND gate 316. One input of the AND gate 316 is connected to a signal DEAD_MAN_TMR_EN, which is provided by an AND gate 306. The first input of the AND gate 306 receives the signal HS_BOOT_EN and the second input is connected to the output of an OR gate 308. The inputs of the OR gate 308 receive signals CM_PRES and TW_PRES, which are provided by D flip-flops 310 and 312, respectively. The D flip-flops 310 and 312 are clocked by the signal OSC, and are reset by the signal OSC_PRESETIN. The D inputs of the D flip-flops 310 and 312 are connected to the signals CM_PRES_REG and TW_PRES_REG, respectively.

The signals CM_PRES_REG and TW_PRES_REG are decoded from bits 4, 5 and 6 of the CPU case register 240, and indicate whether the P54CM processor is present or two primary processors are present, respectively. Before the CPU case register 240 is written with the proper values by the power on processor, the states of bits CPU_CASE[6:4] are determined from the states of the signals P54CM_INSTALLED, TW_PEAKS, and APIC_PRES provided by the latch 300. If the signal P54CM_INSTALLED is asserted high, then the register bit CPU_CASE[6] is set high. If the signal TW_PEAKS is asserted high, then the register bit CPU_CASE[4] is set high. Further, if the signals TW_PEAKS and APIC_PRES are both asserted high, the register bit CPU_CASE[5] is set high. The signal CM_PRES_REG is asserted high if register bits CPU_CASE[6:4] contain the value 0b100. The signal TW_PRES_REG is asserted high if the register bits CPU_CASE[6:4] contain either the value 0b011 or 0b001.

Thus, effectively, the signal DEAD_MAN_TMR_EN is driven high if the processor board P is configured as a dual processor system, the hot spare boot capability is enabled as indicated by the signal HS_BOOT_EN, and the synchronized reset signal OSC_PRESETIN has been negated. Assertion of the signal DEAD_MAN_TMR_EN effectively enables the counter 242 to decrement from its initial value of 0x1B4F4C8. The counter 242 is clocked by the signal OSC, and provides output signals DEAD_MAN_TMR[24:0]. The output of the counter 242 is provided to a comparator 314, which asserts a signal TMR_EQ_0 high when the counter 242 has decremented down to 0. The inverted state of the signal TMR_EQ_0 is provided to the other input of the AND gate 316. Once the dead man counter 242 counts down to zero, it is disabled from further decrementing; as a result, the counter 242 remains at the value zero.

The signal TMR_EQ_0 is also provided to the signal INPUT of a synchronizer circuit 315. The synchronizer circuit 315 also includes a CLK input, a RESET input, and an output, which are connected to the signals PCICLK, S_PRESETIN, and S2_DEAD_MAN, respectively. The signal INPUT of the synchronizer circuit 315 is connected to the 0 inputs of multiplexors 318 and 320. The 1 inputs of the multiplexors 318 and 320 are grounded low and their select inputs are connected to the RESET input. The outputs of the multiplexors 318 and 320 are provided to the D inputs of D flip-flops 322 and 324. The D flip-flop 322 is clocked on the rising edge of the CLK input, and the D flip-flop 324 is clocked on the falling edge of the CLK input. The outputs of the D flip-flops 322 and 324 are provided to the inputs of an OR gate 326, whose output is connected to the 0 input of a multiplexor 328. The 1 input of the multiplexor 328 is grounded low, and its select input is connected to the RESET input. The output of the multiplexor 328 is connected to the D input of a D flip-flop 330, which is clocked on the rising edge of the CLK input. The output of the D flip-flop 330 is connected to the output of the synchronizer circuit 315, which in turn drives the signal S2_DEAD_MAN to indicate whether the dead man counter 242 has timed out. The net effect of the synchronizer circuit 315 is to delay the assertion and deassertion of the signal S2_DEAD_MAN by two PCICLK clocks from the signal TMR_EQ_0.

Once the dead man counter 242 counts down to 0, and the signal TMR_EQ_0 is asserted high, a second counter 332 is enabled by the signal TMR_EQ_0. The reset input of the counter 332 is connected to the output of an OR gate 334, whose first input receives the signal OSC_PRESETIN. During system reset, the counter 332 is reset to the value 0x37EE. The other input of the OR gate 334 is connected to the output of an AND gate 336, which receives input signals TMR_EQ_0 and S2_STOP_ONE_MS_TMR. The counter 332 also includes a load input, which when asserted high loads the counter 332 with the value 0x0004. The load input is connected to the output of an AND gate 338, whose inputs receive signals TMR_EQ_0 and S2_LOAD_COUNT. The enable input of the counter 332 is connected to the signal TMR_EQ_0, and the counter 332 is clocked by the signal OSC. The counter 332 decrements on each rising edge of the clock OSC if the signal TMR_EQ_0 is asserted. Further, when the counter 332 reaches the value zero, it wraps around back to the initial value 0x37EE. The counter 332 provides output signals ONE_MS_TMR [15:0], which are received by comparators 340 and 342. The comparator 340 asserts a signal ONE_MS_PASSED if the counter 332 has counted down to the value zero, indicating that 1 millisecond has elapsed. The comparator 342 asserts a signal PULSE_TIMEOUT high when the counter 332 decrements to the value 6.

The signal ONE_MS_PASSED is provided to the signal input of a synchronizer circuit 344, which contains the same components as the synchronizer circuit 315. The CLK input of the synchronizer circuit 344 is connected to the signal PCICLK, its RESET input is connected to the signal S_PRESETIN, and its output provides a signal S2_ONE_MS_PASSED. The signal PULSE_TIMEOUT is provided to the signal input of another synchronizer circuit 346, which is also clocked by the signal PCICLK and reset by the signal S_PRESETIN. The output of the synchronizer circuit 346 provides a signal S2_PULSE_TIMEOUT. The signals S2_ONE_MS_PASSED and S2_PULSE_TIMEOUT are versions of the signals ONE_MS_PASSED and PULSE_TIMEOUT, respectively, delayed by two rising edges of the clock PCICLK.

Figure 4:
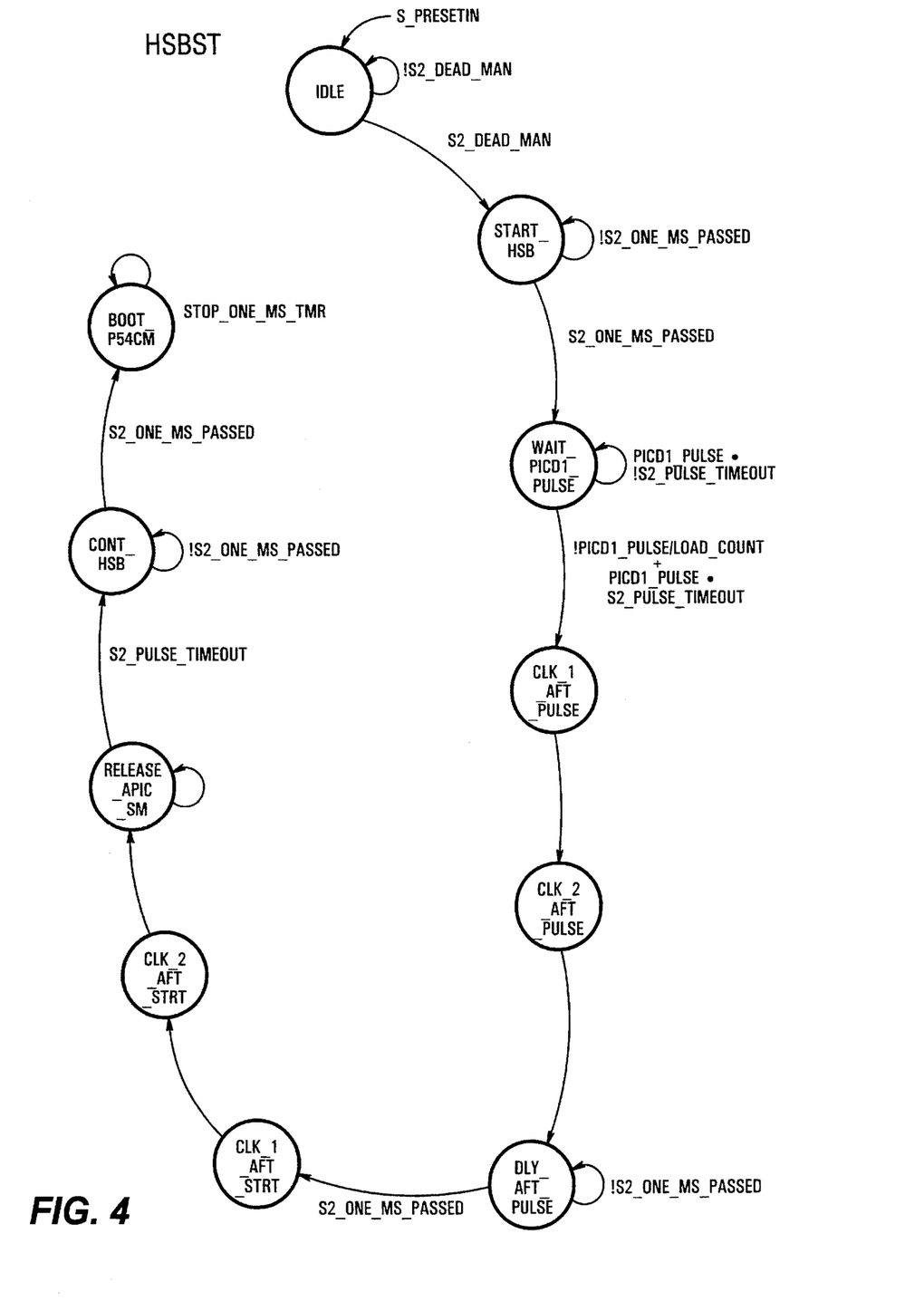
FIG. 4 is a state diagram of a state machine in the hot spare boot circuit.

Referring now to FIG. 4, a state diagram of a state machine HSBST is shown. On system reset, indicated by the signal S_PRESETIN, the state machine HSBST transitions to or remains in state IDLE. When the signal S_PRESETIN is negated, the state machine remains in state IDLE until the signal S2_DEAD_MAN is asserted high, indicating that the deadman timer has timed out. In response, the state machine HSBST transitions to state START_HSB. As will be described in FIG. 5, the reset signals PRESETOUT[2:1] are asserted high when the state machine HSBST enters state START_HSB. The signals PRESETOUT[2:1] are thereafter maintained high until certain other conditions occur, as will be described in FIG. 5. It is noted that all transitions of the state machine HSBST occur on the rising edge of the clock PCICLK. The state machine HSBST remains in state START_HSB until the signal S2_ONE_MS_PASSED is asserted high to indicate that approximately 1 millisecond has passed since the dead man counter 242 has timed out. From state START_HSB, the state machine transitions to state WAIT_PICD1_PULSE, where it remains while the signal PICD1_PULSE is asserted high and the signal S2_PULSE_TIMEOUT is negated low.

Referring back to FIG. 3, the signal PICDI_PULSE is provided by a D flip-flop 352. The D input of the D flip-flop 352 is connected to the output of a D flip-flop 350, whose D input is connected to the signal PICD[1]. The D flip-flops 350 and 352 are clocked by the signal PCICLK, and both are reset low by the signal S_PRESETIN. As noted above, in the P54C/CM dual processor system, the P54CM processor drives the PICD[0]/DPEN* pin low when the signal PRESET is asserted high. Assertion of the signal PICD[0] causes any other I/O APICs present in the computer system, such as one in an ESC chip if present, to think that the system has started. The I/O APIC 244 in the PMIC 238 does not respond to the assertion of the signal PICD[0] as the state machine in the I/O APIC 244 is maintained in the reset state. In response to the assertion of the signal PICD[0], the ESC drives the APIC data bit PICD[1] low every 20 PICCLK clocks. The PICCLK clock is used to control transfers over the APIC bus PICD[1:0] and is driven from the OSC clock, which preferably runs at approximately 14.3 Mhz. The bit PICD[1] is pulsed low for either 1 or 2 PICCLK clocks, depending on the message transmitted during a status cycle as standard in I/O APIC operation and known to those skilled in the art.

The P54CM processor samples the state of the signal PICD[1] on the falling edge of the signal PRESET provided by the CMC 210. If the signal PICD[1] is sampled low, then the local APIC of CPU2 is disabled. However, if the signal PICD[1] is sampled high, the local APIC is enabled. Therefore, to ensure that PICD[1] is not driven low by the miscellaneous logic chip 132 when the signal PRESET is being provided to the P54CM processor, the state machine HSBST waits in state WAIT_PICD1_PULSE until the signal PICD1_PULSE is driven low by the I/O APIC 244 or the ESC. By waiting for a sufficiently long period after the signal PICD1_PULSE has been negated low, the signal PICD1_PULSE is allowed to come back high before PRESET is negated low by the CMC 210. Without the state WAIT_PICD1_PULSE, if for some reason the signal PICD [1] is sampled low as the reset signal PRESET is negated low—which may occur if there is a race condition between the rising edge of the signal PICD[1] and the falling edge of the signal PRESET or if the processors are reset separately from the I/O APIC 244 and the problem is not addressed—the local APIC of CPU2 would be disabled. As a result, the P54CM processor would be unable to respond to a subsequent startup IPI message for waking up CPU2 at the end of the hot spare boot sequence. The consequences would be fatal, as CPU2 would be unable to power up the computer system.

Referring again to FIG. 4, the state machine HSBST transitions from state WAIT_PICD1_PULSE to state CLK_1_AFT_PULSE if either the signal PICD1_PULSE is negated low or both the signals PICD1_PULSE and S2_PULSE_TIMEOUT are asserted high. The second condition ensures that, if PICD[1] is not driven low, the state machine HSBST is able to proceed after the timeout signal S2_PULSE_TIMEOUT goes high. If the signal PICD1_PULSE is negated low, then the state machine HSBST asserts a signal LOAD_COUNT high.

Figure 5:
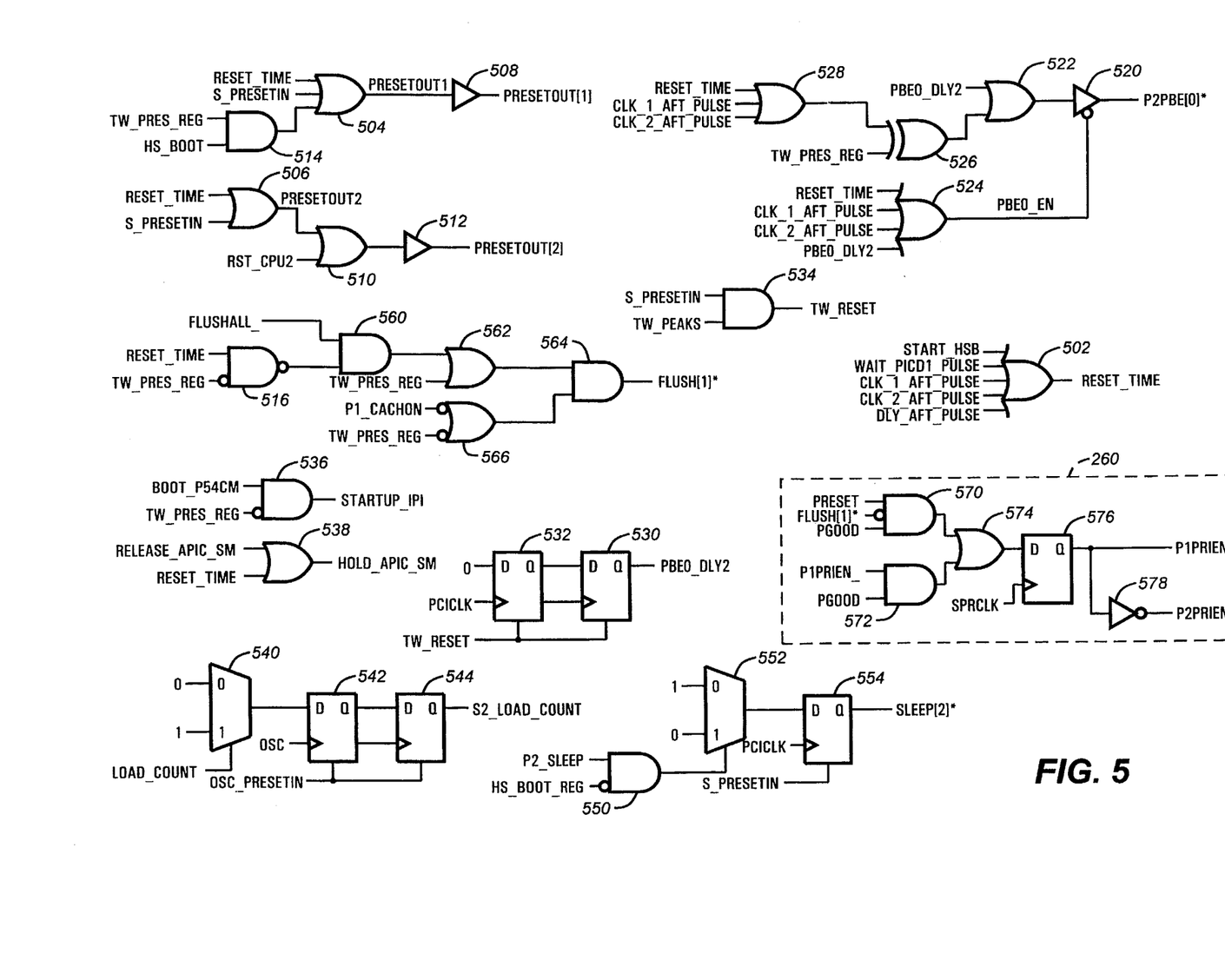
FIG. 5 is a logic diagram of portions of the hot spare boot circuit providing control signals to the processors.

Referring now to FIG. 5, the signal LOAD_COUNT is provided to the select input of a multiplexor 540, whose 0 and 1 inputs are tied low and high, respectively. The output of the multiplexor 540 is connected to the D input of the D flip-flop 542. The output of the D flip-flop 542 is in turn connected to the D input of a D flip-flop 544, which provides the signal S2_LOAD_COUNT. The D flip-flops 542 and 544 are clocked by the signal OSC and reset by the signal OSC_PRESETIN. The signal S2_LOAD_COUNT is provided to the AND gate 338 in FIG. 3 to load the counter 332 with the value 0x0004. This value of 0x0004 ensures that there is a 4 OSC clock delay before the signal PRESETOUT [1] is allowed to be negated, as explained below.

Referring back to FIG. 4, from state CLK_1_AFT_PULSE, the state machine HSBST transitions to state CLK2_AFT_PULSE on the next rising edge of clock PCICLK. The states CLK_1_AFT_PULSE and the CLK2_AFT_PULSE are dummy states inserted to ensure that all signals have stabilized. From state CLK_2_AFT_PULSE, the state machine HSBST transitions to state DLY_AFT_PULSE on the next rising edge of clock PCICLK.

Referring again to FIG. 5, an OR gate 502 receives signals START_HSB, WAIT_PICD1_PULSE, CLK_1_AFT_PULSE, CLK_2_AFT_PULSE, and DLY_AFT_PULSE which indicate that the state machine HSBST is in one of the corresponding states. In other words, the signal START_HSB represents that the state machine HSBST is in state START_HSB, etc. The output of the OR gate 502 provides a signal RESET_TIME. The signal RESET_TIME is provided to one input of an OR gate 504 and one input of an OR gate 506. The outputs of the OR gates 504 and 506 provide signals PRESETOUT1 and PRESETOUT2, respectively. The signal PRESETOUT1 is provided to a buffer 508, whose output drives the signal PRESETOUT[1]. The signal PRESETOUT2 is provided to one input of an OR gate 510, whose other input receives a signal RST_CPU2. The output of the OR gate 510 is connected to the input of a buffer 512, whose output drives the signal PRESETOUT[2]. In the two primary processor without APIC configuration, the signal RST_CPU2 is used to control the state of PRESETOUT[2] when CPU1 is attempting to awaken CPU2. In response to the reset bit of the CPU2 control register being set high by CPU1, the PMIC 238 asserts the signal RST_CPU2 for 15 PCICLK clocks. While the hot spare boot state machine is not in the IDLE state, the signal SLEEP[2]* is negated to allow CPU2 to be awakened after the signal PRESETOUT [2] is released.

During normal power up operations by CPU1 in either of the two primary processor configurations, CPU2 is maintained disabled by keeping the sleep bit of the CPU2 control register in the PMIC 238 set at the high state. The sleep bit of the CPU2 control register, represented as a signal P2_SLEEP, is provided to one input of an AND gate 550, whose other input receives the inverted state of a signal HS_BOOT_REG. The signal HS_BOOT_REG represents the state of CPU case register bit CPU_CASE[7]. If the CPU case register 240 has not yet been written once, the bit CPU_CASE[7] is equal to a signal HS_BOOT. The signal HS_BOOT is asserted high when the state machine HSBST is not in state IDLE, which means that it remains asserted once the state machine HSBST leaves the IDLE state until the computer system is reset.

The output of the AND gate 550 is connected to the select input of a multiplexor 552. The 0 and 1 inputs of the multiplexor 552 are tied high and low, respectively. The output of the multiplexor 552 is connected to the D input of the D flip flop 554, whose output Provides the signal SLEEP[2]*. The D flip flop 554 is clocked on the rising edge of PCICLK and reset by S_PRESETIN. During normal operation, the signal SLEEP[2]* is deasserted only when the sleep bit P2_SLEEP is set low by CPU1. However, during the hot spare boot sequence, once the state machine HSBST leaves state IDLE and the signal HS_BOOT is asserted, the signal SLEEP[2]* is deasserted high to allow CPU2 to wake up.

Once the dead man counter 242 expires and the state machine HSBST enters state START_HSB, both signals PRESETOUT[1] and PRESETOUT[2] are asserted high to reset CPU1 and CPU2. At the same time, the signal SLEEP [2]* is deasserted low in the two primary processor configuration to allow CPU2 to begin the power on procedure once the signal PRESETOUT[2] is negated by the PMIC 238.

Both OR gates 504 and 506 also receive the signal S_PRESETIN. When the system reset signal PRESETIN is asserted by the PCI-EISA bridge 130, the CPU reset signals PRESETOUT[2:1] are also driven high one PCICLK later. When the signal PRESETIN is negated low, the signals PRESETOUT[2:1] are negated low one PCICLK clocks later under normal conditions, i.e., CPU1 is operational. Otherwise, if CPU1 is non-operational, the signal RESET_TIME drives both signals PRESETOUT[2:1] back high when the state machine HSBST enters state START_HSB.

The final input of the OR gate 504 is connected to the output of an AND gate 514, whose inputs receive signals TW_PRES_REG and HS_BOOT. Thus, if the multiprocessor system is configured with two primary processors, and the dead man counter 242 has expired indicating a CPU1 failure, the signal PRESETOUT[1] is maintained high to disable CPU1 200A until the next system reset, in which case the same procedure as described is repeated to determine if CPU1 is operational. In the two primary processor configuration, CPU1 200A is disabled simply by keeping it in the reset state. This is allowable as CPU1 200A and CPU2 201A are connected to separate buses.

The signal RESET_TIME is also provided to one input of a NAND gate 516, whose other input receives the inverted state of the signal TW_PRES_REG. The output of the NAND gate 516 is connected to one input of an AND gate 560, whose other input is connected to a signal FLUSH-ALL_. The signal FLUSHALL_is asserted by the PMIC 238 in response to commands issued by the CMC 210 for flushing the internal caches of CPU1 and CPU2 as well as the L2 cache 208. Flush and cache on bits in the CPU1 and CPU2 control registers of the PMIC 238 are set high or toggled to indicate that the L1 and L2 caches are to be flushed. The output of the AND gate 560 is connected to one input of an OR gate 562, whose other input is connected to the signal TW_PRES_REG. The output of the OR gate 562 is connected to an input of the AND gate 564, whose other input is connected to the output of a NAND gate 566. The inputs of the NAND gate 566 receive signals P1_CACHON and TW_PRES_REG. The signal P1_CACHON is the cache on bit of the CPU1 control register of the PMIC 238. The output of the AND gate 564 drives the signal FLUSH [1]*, which is asserted during the hot spare boot sequence to place CPU1 200 in the tristate test mode.

If the multiprocessor system is configured in the P54C/CM mode, the signal FLUSH[1]* is asserted when the dead man counter 242 times out. The output pins of the non-operational CPU1 200 are thus tristated so that they will not interfere with the operations of CPU2 201. In the P54C/CM configuration, this is required as CPU1 and CPU2 share the same processor bus 202. In the two primary processor configuration, the signal FLUSH[1]* is not asserted during the hot spare boot sequence.

The signal RESET_TIME is further provided to one input of an OR gate 538, whose other input receives a signal RELEASE_APIC_SM. The output of the OR gate 538 provides a signal HOLD_APIC_SM. While the signal RESET_TIME is asserted high, the signal HOLD_APIC_SM is asserted high to disable a state machine in the I/O APIC 244 to ensure that the I/O APIC 244 does not respond to the assertion of the signal PICD[0] by CPU2 in the P54C/CM configuration.

Referring back to FIG. 4, the state machine HSBST remains in state DLY_AFT_PULSE until the signal S2_ONE_MS_PASSED is asserted high, in which case the state machine HSBST transitions to state CLK_1_AFT_STRT. The signal S2_ONE_MS_PASSED is asserted high from 4 to 6 OSC clocks after the state machine HSBST transitions out of state WAIT_PICD1_PULSE. This is because the state machine HSBST transitions to state CLK_1_AFT_PULSE either in response to the signal PICD1_PULSE being negated (thereby asserting the signal LOAD_COUNT and loading the counter 232 with the value 0x0004 one PCICLK later) or to the signal S2_PULSE_TMOUT being asserted high (indicating that the counter 232 has reached the value 0x0006).

On the transition to state CLK_1_AFT_STRT, the signal RESET_TIME is negated low. As a consequence, in the P54C/CM dual processor configuration, the signal PRESETOUT[1] is negated low, thereby causing the CMC 210 to deassert the signal PRESET to CPU1 and CPU2. For the two primary processor configuration, the signal PRESETOUT[1] is maintained high while the signal PRESETOUT [2] is negated low. From state CLK_1_AFT_STRT, the state machine HSBST transitions to state CLK_2_AFT_STRT. On the next PCICLK clock, the state machine HSBST transitions to state RELEASE_APIC_SM.

Referring again to FIG. 5, the signal P2PBE[0]* is driven by a tristate buffer 520, whose input is connected to the output of an OR gate 522. The enable input of the tristate buffer 520 is connected to the inverted state of a signal PBE0_EN provided by an OR gate 524. The first input of the OR gate 522 receives a signal PBE0_DLY2, and its second input is connected to the output of an exclusive OR gate 526. The first input of the exclusive OR gate 526 receives the signal TW_PRES_REG, which indicates whether the multiplexor system is in the two primary processor configuration. The other input of the exclusive OR gate 526 is connected to the output of an OR gate 528. The inputs of the OR gate 528 receive signals RESET_TIME, CLK_1_AFT_STRT, and CLK_2_AFT_STRT. The inputs of the OR gate 524 receive signals RESET_TIME, CLK_1_AFT_STRT, CLK_2_AFT_STRT, and PBE0_DLY2.

Thus, before the state machine HSBST reaches state RELEASE_APIC_SM, the output of the OR gate 528 is driven low. However, once the state machine HSBST has transitioned to state RELEASE_APIC_SM, the output of the OR gate 528 is driven high. If the two primary processor configuration is used and the signal TW_PRES_REG is asserted, the exclusive OR gate 526 outputs a zero. However, if the P54C/CM dual processor mode is used, the exclusive OR gate 526 outputs a high. At the same time that the output of the OR gate 528 is negated low when the state machine HSBST reaches state RELEASE_APIC_SM, the output of the OR gate 524 is also negated low to enable the tristate buffer 520. Thus, in the P54C/CM dual processor configuration, the signal P2PBE[0]* is driven high, while in the two primary processor configuration, the signal P2PBE[0]* is driven low. Driving the signal P2PBE[0]* high to the P54CM processor forces the local APIC ID of the P54CM to be 0b0000. As explained earlier, this is normally the local APIC ID assigned to the P54C processor. However, as the P54C processor is determined to be non-operational, the local APIC ID of the P54CM is reassigned so that it can properly start up the computer system. Driving the signal P2PBE[0]* low to a P54C processor in the two primary processor configuration also causes the local APIC ID of CPU2 201A to be reassigned to the value 0b0000. It is noted that for the two primary processor mode without local APICs, there is no APIC ID to reassign. CPU2 is simply awakened to handle the power up of the computer system.

The signal PBE0_DLY2 is provided to the OR gates 522 and 524 to ensure that the signal P2PBE[0]* is asserted high while the system reset signal PRESETIN is asserted high, and for two PCICLK clocks after negation of the signal PRESETIN. The signal PBE0_DLY2 is provided by a D flip-flop 530, whose D input is connected to the output of a D flip-flop 532. The D input of the D flip-flop 532 is grounded low. Both D flip-flops 530 and 532 are clocked by the signal PCICLK, and both are reset to a high state by a signal TW_RESET. The signal TW_RESET is provided by an AND gate 534, whose inputs receive the signals S_PRESETIN and TW_PEAKS.

Returning now to FIG. 4, the state machine HSBST transitions from state RELEASE_APIC_SM to state CONT_HSB when the signal S2_PULSE_TIMEOUT is asserted high, indicating that the counter 332 has counted down to 0x0006. The state machine HSBST remains in state CONT_HSB for approximately 6 OSC clocks until the signal S2_ONE_MS_PASSED is asserted high. When that occurs, the state machine HSBST transitions to state BOOT_P54CM. In state BOOT_P54CM, the state machine HSBST drives a signal STOP_ONE_MS_TMR high. The signal STOP_ONE_MS_TMR is provided to the input of a synchronizer circuit 333 (FIG. 3), which is clocked by the signal OSC and reset by the signal OSC_PRESETIN. The output of the synchronizer circuit 333 provides the signal S2_STOP_ONE_MS_TMR, which is provided to the AND gate 336 for resetting the counter 332 to the initial value 0x37EE. The state machine HSBST stays in state BOOT_P54CM until the computer system is reset, as indicated by the signal S_PRESETIN, which restarts the state machine HSBST at state IDLE.

Returning now to FIG. 5, the signal BOOT_P54CM, which indicates that the state machine HSBST is in state BOOT_P54CM, is provided to one input of an AND gate 536. The other input of the AND gate 536 is connected to the inverted state of the signal TW_PRES_REG. The output of the AND gate 536 drives the signal STARTUP_IPI. In the first embodiment of the P54C/CM dual processor configuration, the signal STARTUP_IPI is asserted high when the state machine reaches the state BOOT_P54CM. Assertion of the signal STARTUP_IPI triggers the I/O APIC 244 to send a startup IPI message to CPU2 201.

However, as noted above, in the second embodiment of the P54C/CM configuration, the CPUTYPE pins of CPU1 and CPU2 are switched to reassign CPU2 as being the primary processor for powering up the computer system. As shown in FIG. 2, the CPUTYPE pin of CPU2 is driven low by the tristate buffer 262 when it is enabled by the signal P2PRIEN_ being asserted low. The CPUTYPE pin of CPU1 is driven low by the tristate buffer 266 when it is enabled by the signal P1PRIEN_ being asserted low. In the PAL 260, the signal P2PRIEN_ is provided by the output of an inverter 578, whose input is connected to the signal P1PRIEN_. The signal P1PRIEN_ is connected to the output of a D flip flop 576, which is clocked by the signal SPRCLK. The D input of the D flip flop 576 is connected to the output of an OR gate 574, whose inputs are connected to the outputs of AND gates 570 and 572. The inputs of AND gates 570 receive signals PRESET, FLUSH[1]*, and PGOOD. The signal PGOOD indicates that the computer system power voltage has reached their active levels. The inputs of the AND gate 572 receive signals P1PRIEN_ and PGOOD. Thus, if the signal FLUSH[1]* is not driven low by the AND gate 574 during the hot spare boot sequence, indicating that CPU1 is functional, the signal P1PRIEN_ is asserted low to enable the tristate buffer 266 and the signal P2PRIEN_ is deasserted high to disable the tristate buffer 262. However, if the signal FLUSH[1]* is asserted low while the signal PRESETOUT[1] is asserted high during the hot spare boot sequence, the signal P1PRIEN_ is deasserted high and the signal P2PRIEN_ is asserted low. As a result, the CPUTYPE pin of CPU2 200 is pulled low, causing it to behave as a P54C processor. Consequently, when the signal PRESET is negated low by the CMC 210 in response to the signal PRESETOUT[1] being negated by the PMIC 238, CPU2 200 vectors to the normal reset location in the BIOS ROM 154 to begin power on operations, rather than the startup location indicated by the startup IPI message.

What has been described is a hot spare boot circuit that automatically switches from a non-operational CPU to an operational CPU for powering up the computer system. In the multiprocessor computer system, a first CPU is designated to perform power on operations. If the first CPU fails, which is determined when a dead man counter in the hot spare boot circuit times out, the hot spare circuit ensures that the first CPU is in a disabled state. Next, the hot spare boot circuit identifies an operational second CPU, reinitializing certain ID information as necessary such that the second CPU can properly perform power on operations. The hot spare boot then awakens the second CPU, using a startup interprocessor interrupt in one embodiment, or simply negating the hard reset of the second CPU in a second embodiment. The second CPU then proceeds to perform the power on functions.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A circuit for ensuring that a local interrupt controller in a microprocessor is powered up active, the microprocessor being responsive to a first reset signal and being connected to a first interrupt control signal and a second interrupt control signal, wherein an external interrupt controller is connected to the first and second interrupt control signals, the external interrupt controller further being responsive to a second reset signal, the second reset signal being asserted during a power up sequence, the second reset signal being deasserted a predetermined amount of time after it has been asserted, wherein the microprocessor asserts the first interrupt control signal when the first reset signal is asserted, wherein the external interrupt controller samples the state of the first interrupt control signal after the second reset signal is deasserted, the external interrupt controller periodically pulsing the second interrupt control signal asserted for a first predetermined period if the first interrupt control signal is sampled asserted, and wherein if the microprocessor samples the second interrupt control signal asserted when the first reset signal is deasserted, the local interrupt controller is deactivated, the circuit comprising:

means responsive to the second reset signal for providing the first reset signal, the first reset signal being asserted shortly after the second reset signal is asserted, and the first reset signal being maintained asserted while the second reset signal is asserted;

means responsive to the second reset signal for sampling the state of the second interrupt control signal after the second reset signal has been deasserted; and means coupled to said sampling means and to said first reset signal providing means for waiting a second predetermined period after said second interrupt control signal has been sampled asserted, wherein said second predetermined period is greater than the first predetermined period, and wherein said first reset signal providing means deasserts the first reset signal said second predetermined period shortly after said second interrupt control signal has been sampled asserted.

2. The circuit of claim 1, wherein said waiting means includes:

a counter that begins counting from an initial value in response to the second interrupt control signal being sampled asserted, wherein the first reset signal is maintained asserted until said counter has reached a final value, wherein the difference between said final value and said initial value represents said second predetermined period, and wherein the first reset signal is deasserted in response to said counter reaching said final value.

3. The circuit of claim 1, wherein said first reset signal providing means has a clock input connected to a first clock signal, and wherein the external interrupt controller has a clock input connected to a second clock signal.

4. The circuit of claim 3, wherein said first clock signal has a higher frequency than said second clock signal.

5. The circuit of claim 1, wherein the microprocessor is a Pentium P54CM processor.

6. The circuit of claim 5, wherein the external interrupt controller is an input/output advanced programmable interrupt controller.

7. The circuit of claim 6, wherein the external interrupt controller is located in an 82374EB EISA System Component chip.

8. A computer system, comprising:

a microprocessor having a local interrupt controller, said microprocessor being responsive to a first reset signal and being connected to a first interrupt control signal and a second interrupt control signal, wherein said microprocessor asserts said first interrupt control signal when said first reset signal is asserted;

means for providing a second reset signal, said second reset signal being asserted during a power up sequence, and said second reset signal being deasserted a predetermined amount of time after it has been asserted;

an external interrupt controller connected to said first and second interrupt control signals, said external interrupt controller further being responsive to said second reset signal, wherein said external interrupt controller samples the state of said first interrupt control signal after said second reset signal is deasserted, said external interrupt controller periodically pulsing said second interrupt control signal asserted for a first predetermined period if said first interrupt control signal is sampled asserted, and wherein if said microprocessor samples said second interrupt control signal asserted when said first reset signal is deasserted, said local interrupt controller is deactivated; and a circuit for ensuring that said local interrupt controller is powered up active, said circuit including:

means responsive to said second reset signal for providing said first reset signal, said first reset signal being asserted shortly after said second reset signal is asserted, and said first reset signal being maintained asserted while said second reset signal is asserted;

means responsive to said second reset signal for sampling the state of said second interrupt control signal after said second reset signal has been deasserted; and means coupled to said sampling means and to said first reset signal providing means for waiting a second predetermined period after said second interrupt control signal has been sampled asserted, wherein said second predetermined period is greater than the first predetermined period, and wherein said first signal providing means deasserts said first reset signal shortly after said second predetermined period.

9. The computer system of claim 8, wherein said waiting means includes:

a counter that begins counting from an initial value in response to said second interrupt control signal being sampled asserted, wherein said first reset signal is maintained asserted until said counter has reached a final value, wherein the difference between said final value and said initial value represents said second predetermined period, and wherein said first reset signal is deasserted in response to said counter reaching said final value.

10. The computer system of claim 8, wherein said first reset signal providing means has a clock input connected to a first clock signal, and wherein said external interrupt controller has a clock input connected to a second clock signal.

11. The computer system of claim 10, wherein said first clock signal has a higher frequency than said second clock signal.

12. The computer system of claim 8, wherein said microprocessor is a Pentium P54CM processor.

13. The computer system of claim 12, wherein said external interrupt controller is an input/output advanced programmable interrupt controller.

14. The computer system of claim 13, wherein said external interrupt controller is located in an 82374EB EISA System Component chip.

15. A method of ensuring that a local interrupt controller in a microprocessor is powered up active, the microprocessor being responsive to a first reset signal and being connected to a first interrupt control signal and a second interrupt control signal, wherein an external interrupt controller is connected to the first and second interrupt control signals, the external interrupt controller further being responsive to a second reset signal, the second reset signal being asserted during a power up sequence, the second reset signal being deasserted a predetermined amount of time after it has been asserted, wherein the microprocessor asserts the first interrupt control signal when the first reset signal is asserted, wherein the external interrupt controller samples the state of the first interrupt control signal after the second reset signal is deasserted, the external interrupt controller periodically pulsing the second interrupt control signal asserted for a first predetermined period if the first interrupt control signal is sampled asserted, and wherein if the microprocessor samples the second interrupt control signal asserted when the first reset signal is deasserted, the local interrupt controller is deactivated, the method comprising the steps of:

asserting the first reset signal shortly after the second reset signal is asserted;

maintaining the first reset signal asserted while the second reset signal is asserted;

sampling the state of the second interrupt control signal after the second reset signal has been deasserted;

waiting a second predetermined period after said second interrupt control signal has been sampled asserted, wherein said second predetermined period is greater than the first predetermined period; and deasserting the first reset signal said second predetermined period shortly after said second interrupt control signal is sampled asserted.

16. The method of claim 15, wherein said step of waiting includes the step of:

starting a counter that counts from an initial value in response to the second interrupt control signal being sampled asserted, wherein the first reset signal is maintained asserted until said counter has reached a final value, wherein the difference between said final value and said initial value represents said second predetermined period, and wherein the first reset signal is deasserted in response to said counter reaching said final value.

17. The method of claim 15, wherein the microprocessor is a Pentium P54CM processor.

18. The method of claim 17, wherein the external interrupt controller is an input/output advanced programmable interrupt controller.

19. The method of claim 18, wherein the external interrupt controller is located in an 82374EB EISA System Component chip.

* * * * *